March 30, 1965   J. L. ROMAND ETAL   3,176,131
MONOCHROMATIC APPARATUS FOR SELECTIVELY REFLECTING
PREDETERMINED WAVELENGTHS FROM A SPECTRUM
Filed June 18, 1962                              2 Sheets-Sheet 1

United States Patent Office 3,176,131
Patented Mar. 30, 1965

3,176,131
MONOCHROMATIC APPARATUS FOR SELECTIVELY REFLECTING PREDETERMINED WAVELENGTHS FROM A SPECTRUM
Jacques Louis Romand, Bourg-la-Reine, and Boris Vodar, Paris, France, assignors to Centre National de la Recherche Scientifique, Paris, France, a French government administration
Filed June 18, 1962, Ser. No. 203,190
Claims priority, application France, June 26, 1961, 866,109
4 Claims. (Cl. 250—51.5)

The present invention relates to apparatus, such as those called monochromators, for selecting a frequency or a frequency band from a spectrum of frequencies emitted by a source, so as to determine and to indicate the position of said frequency or frequency band in the scale of frequencies. Apparatus of this kind are to be used in particular for studying radiations emitted from a light source in the remote, or extreme, ultraviolet range, which for instance extends from soft X-rays on one side to the 1000 Angstroms limit on the other side, these limits being given merely by way of indication.

The chief object of our invention is to provide an apparatus of this kind which is simpler to manufacture and easier to operate than those known up to this time.

The apparatus with which this invention is concerned comprises a concave grating adapted to cooperate with a light source and with two slits, an entrance one and an exit one, in such manner that these slits remain upon a circle tangent to the grating and of a diameter equal to the radius of curvature of this grating. According to our invention, we provide mechanical means for moving the center of the grating along a fixed straight line passing through one of these slits, which is fixed, for moving the other slit along another fixed straight line passing through said first mentioned slit, and for keeping said second mentioned slit and said grating in constant relative position with respect to each other.

Other features of our invention will be hereinafter described, with reference to the appended drawings, given merely by way of example, and in which:

FIG. 2 is an elevational view, partly in section, of a monochromator made according to the invention;

FIG. 3 is a plan view, partly in section, of said monochromator;

It will first be reminded that, in a monochromator, the concave grating is intended to produce, like a prism, a deviation of the incident light rays variable in accordance with their respective wavelengths.

Selection of a line or band is obtained by means of an exit slit which permits the passage of only one (or a limited number) of the multiple rays deviated by the grating from the composite ray or ray beam coming from the source to be analyzed. This composite ray will be determined geometrically by another slit, the entrance slit, combined with the source.

Modification of the position of the band that is selected, i.e. that is allowed to pass through the exit slit, is obtained by modifying the relative positions of the elements, i.e. of the grating and of the two slits.

The width of the band, upon which depends the quality of the apparatus, is a function of the width of the slits and of the care taken to ensure a good focussing, i.e. the formation of an image as sharp as possible of the entrance slit on the exit slit, and this within the whole range of utilisation of the apparatus.

It is known that such a focussing is obtained if both of the slits remain upon a circle (called Rowland's circle) tangent to the grating at its center and of a diameter equal to the radius of curvature of the grating.

Figure 1:
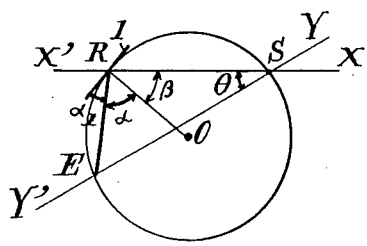
FIG. 1 is a diagram illustrating the operation of the apparatus according to this invention.

This circle is circle C, of center O, in FIG. 1. The grating 1 is tangent to this circle at point R. One of the slits is shown at E (being for instance the entrance slit through which passes the radiation form the source to be studied), and the other second slit is shown at S (being therefore the exit slit in this case).

In a monochromator according to the invention:
(1) Two elements of the system are fixed, to wit the length ER, and the angle $\alpha$ between line ER and radius RO, which therefore means that grating 1 moves in such manner as to remain in a fixed position with respect to said line ER (the complementary angle $\alpha_1$ being also constant);
(2) On the contrary, the length RS is variable; and
(3) Point S is fixed, same as lines SR and SE, located respectively along XX' and YY'.

This construction is advantageous because it is simple and comprises a fixed slit S and a branch of fixed direction (RS).

Figures 2, 3:
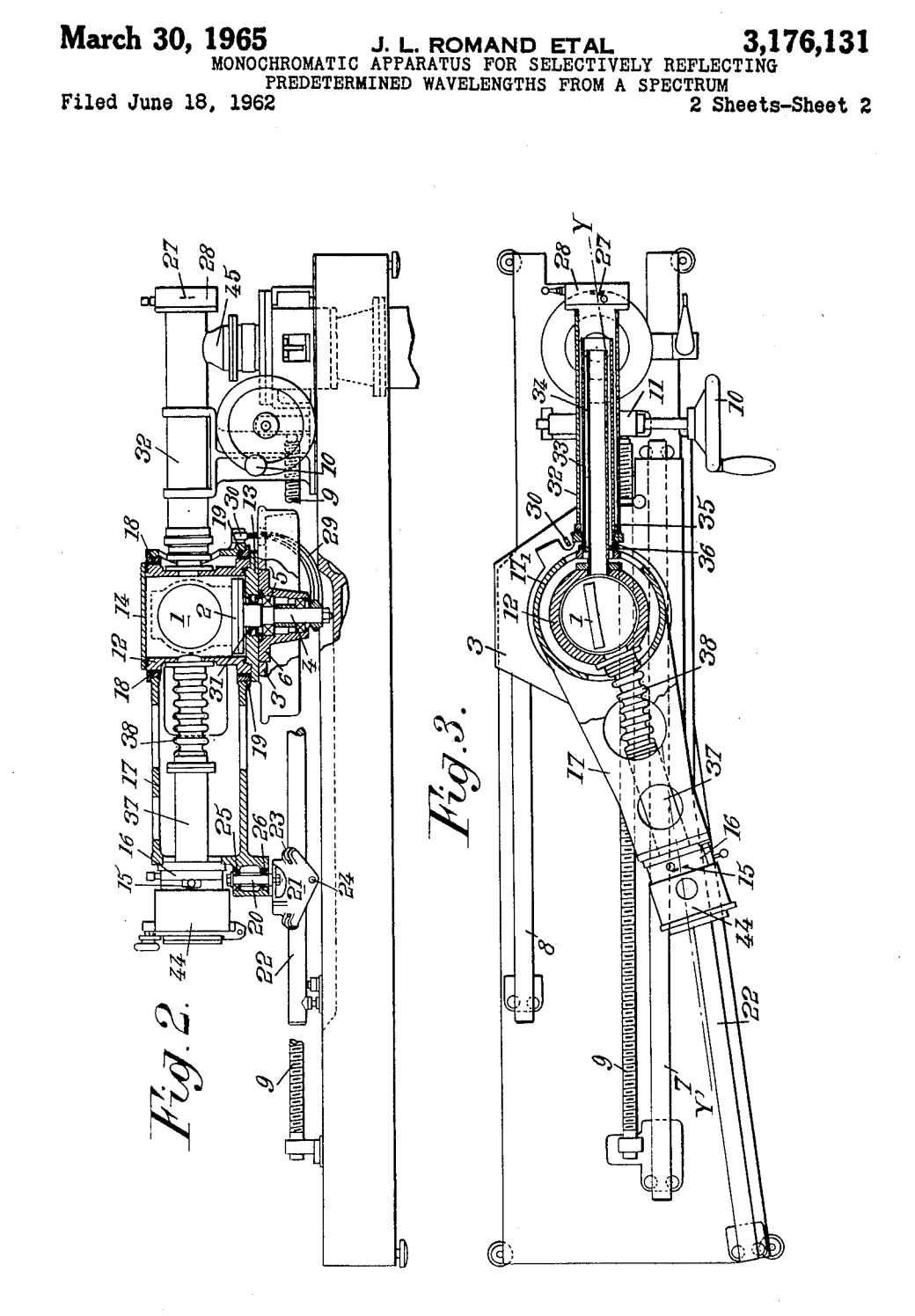

FIGS. 2 and 3 show a practical embodiment of the invention.

The grating 1 is mounted on a platform 2 carried by a vertical spindle 4 pivotable in a cage 6, with the interposition of bearings 5, this cage 6 being mounted in a plate 3. This plate 3 is movable with respect to the frame F of the apparatus with a sliding movement along bars 7 and 8 (parallel to the direction XX') with the interposition of rollers (not shown) between plate 4 and said bars. The displacement of plate 3 along said bars 7 and 8 is produced by a screw 9, controlled by a hand wheel 10 and a transmission located in a casing 11, a bolt rigid with plate 3 (and not visible on the drawing) being engaged on screw 9. Grating 1 is surrounded by a cylindrical casing 12 having a bottom 13 and a cover 14, this casing being fixed with respect to plate 3.

Slit E is located at 15 in a casing 16 which contains means for adjusting this slit, and also a small valve acting as a closing element. This casing 16 is rigidly carried by an arm 17 of flaring shape. The larger end of this arm 17 pivotally surrounds cylinder 12 at the top and at the bottom thereof, through bearings 18 and 19, in order to permit a movement of rotation of this arm about the axis of said cylinder 12.

Thus the hinge connection between lines ER and RS (FIG. 1), i.e. between arm 17 and telescopic tube 32–33–34, to be hereinafter referred to, is constituted by the end $17_1$ of arm 17 pivotally surrounding cylindrical casing 12 (rigid with telescopic tube element 34) with the interposition of bearings 18 and 19.

As for the sliding movement of the end E of element ER along line YY', it is obtained as follows.

On the vertical of slit E, illustrated at 15 in FIGS. 2 and 3, and below this slit, there is provided a vertical spindle 20 rigid with a carriage 21 adapted to slide along a bar 22. The connection between this carriage and this bar is ensured by rollers 23 and 24. The vertical spindle 20 is journalled in arm 17 through bearings 25 and 26.

Bar 22 corresponds to the line YY' of FIG. 1. As a matter of fact, for the sake of commodity in order to avoid that the right hand end of bar 22 intersects bar 7 (which would limit the possible displacements) bar 22 is laterally off-set with respect to line YY', which must pass through slit S, located at 27 in a casing 28 identical to casing 16. Spindle 20 is similarly off-set with respect to arm 17, so that slit 15 truly moves along line YY' parallel to 22 and passing through slit 27.

As above stated, grating 1 must occupy a fixed position with respect to element ER, i.e. with respect to arm 17. Now this grating 1 is pivoted at 4 with respect to plate 3. Therefore it suffices to connect said grating with arm 17 through a bent lever 29, the lower end of which is secured to the bottom end of spindle 4, whereas its top end 30 is fixed to arm 17. Thus the angle $\alpha$ has a constant value and the length ER is constant.

We will now describe the means for ensuring gastightness.

Casing 12–13–14 is made gastight by the provision of suitable packing joints. In a likewise manner gastight connection of spindle 4 with respect to the bottom 13 of casing 12–13–14 is ensured by packing joints 31.

The connection between casing 28 (containing slit S, i.e. 27) and casing 12 is ensured by three telescopic tubes 32–33–34, tube 34 being fixed to casing 12. These tubes slide in one another, gastightness being ensured by packing joints 35–36.

Casing 16 (containing slit E, i.e. 15) is connected with a tube 37, the axis of which intersects the axis of spindle 4 and the surface of grating 1. The connection between tube 37 and casing 12 is ensured by means of a flexible tube 38 which permits displacement of rigid tube 37 with respect to casing 12 within the limits necessary for observation of the spectrum range to be covered by the apparatus.

Figure 4:
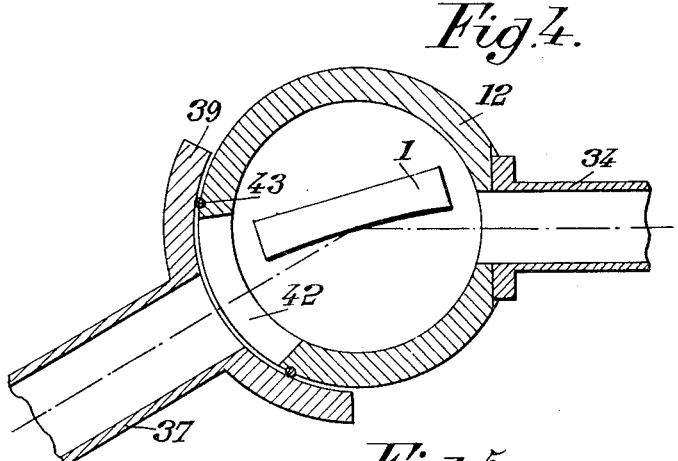
FIG. 4 is an horizontal sectional view of a portion of a monochromator made according to a modification.
Figure 5:
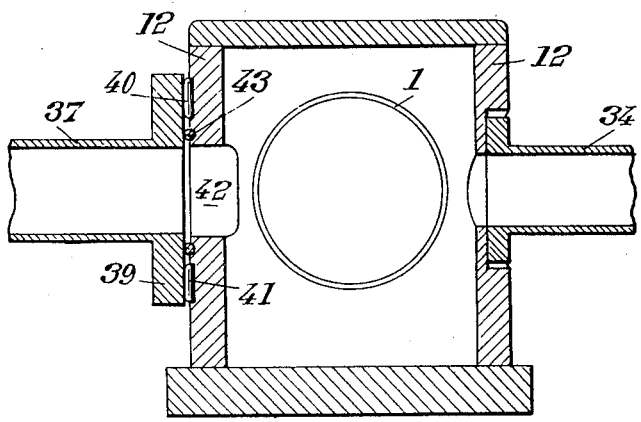
FIG. 5 is a vertical sectional view corresponding to FIG. 4.

A modification of the invention consists in using, instead of flexible tube 38, the device shown by FIGS. 4 and 5.

The end of tube 37 carries, fixed thereto, a piece 39 in the form of a portion of a cylinder adapted to fit slidably on the outer wall of casing 12, with the interposition of two rows of needles 40–41. The axis of tube 37 thus sweeps, in its movement, an orifice of rectangular outline 42 provided in the wall of casing 12. Gastightness is ensured by a packing joint 43 surrounding orifice 42. Finally a device, not shown, permits variation of the length of tube 37 to exert a suitable pressure on joint 43.

The apparatus further comprises a spark chamber 44 (FIGS. 2 and 3) which, in this embodiment, constitutes the light source, and which is not an element of the invention, and also pumping means connected at 45 with tube 32.

The apparatus according to our invention has many advantages over similar apparatus known at the present time. In particular these advantages are as follows.

An easy access is ensured to the light source and also to the active elements of the apparatus, owing to the fact that vacuum is provided only inside the apparatus (the slits being, of course, closed by any optical or transparent device).

The volume in which vacuum is to be ensured is small.

It is possible to have an exit slit which is fixed and also a fixed exit beam.

The operation may be reversed.

As a matter of fact the apparatus according to this invention may be used in either of the two different ways.

It may be arranged as shown by FIGS. 2 and 3, slit E (15) being used as exit slit. In this case the devices (receiver) mounted beyond the exit slit S are fixed. But the light source is movable since it is carried by arm 17, for instance as shown at 44. This manner of using the apparatus, therefore, applies to the case of relatively light weight sources.

We may also provide the exit slit at S (27). In this case the source may be heavy and of large size since it is not to be moved. But the exit slit is in this case at E (15). The receiver must be sufficiently light to be easily movable.

We will now give particulars of an embodiment of the invention:

Radius of curvature of the
  grating _____ 3 meters.
Angle $\theta$ _____ 8°.
Angle $\alpha$ _____ 82°.
Angle $\beta$ (ORS) _____ From 80°22' to 68°46'.
Displacement of the grating ____ 585 mm.

With such a construction and with a grating of 576 lines the spectrum to be studied ranges from 70 to 1000 A.

In a general manner while we have, in the above description, disclosed what we deem to be a practical and efficient embodiment of our invention, we do not wish to be limited thereto as there might be changes made in the arrangement, disposition and form of the parts without departing from the principal of our invention as comprehended within the scope of the appended claims.

What we claim is:

1. A monochromator which comprises, in combination,
a frame,
a first support exclusively slidable with respect to said frame in a first direction fixed with respect to said frame,
a second support exclusively slidable with respect to said frame in a second direction making a fixed angle with said first direction,
means carried by said frame in fixed position thereon forming a first slit extending in a direction perpendicular to both of said directions,
means carried by said second support forming a second slit parallel to the first one and located in a plane parallel to said second direction and passing through said first slit,
a rigid arm of fixed length pivoted, at one end, to said second support about a pivot axis coinciding with said second slit and, at the other end, to said first support about another pivot axis parallel to said two slits, said last mentioned pivot axis intersecting the line parallel to said first direction passing through said first slit, and
a concave grating rigidly carried by said arm at the place thereon where is located said second mentioned pivot axis and the radius of curvature of which in section planes parallel to both of said directions are equal to the diameter of the Rowland circle passing through said two slits and said second mentioned pivot axis.

2. A monochromator which comprises, in combination,
a frame,
a first support exclusively slidable with respect to said frame in a first direction fixed with respect to said frame,
a second support exclusively slidable with respect to said frame in a second direction making a fixed angle with said first direction,
means carried by said frame in fixed position thereon forming a first slit extending in a direction perpendicular to both of said directions,
means carried by said second support forming a second slit parallel to the first one and located in a plane parallel to said second direction which passes through said first slit,
a rigid arm of fixed length pivoted, at one end, to said second support about a first pivot axis coinciding with said second slit and, at the other end, to said first support about a second pivot axis parallel to said two slits, said second pivot axis intersecting the line parallel to said first direction passing through said first slit,
a concave grating rigidly carried by said arm at the place thereon where is located said second pivot axis and the radius of curvature of which in section planes parallel to both of said directions are equal to the diameter of the Rowland circle passing through said two slits and said second mentioned pivot axis,
a first closed fluidtight casing surrounding said first slit,
a second closed fluidtight casing surrounding said grating,
a telescopic tube having its ends secured to said first casing and said second casing, respectively, said telescopic tube extending in the first direction,
a third closed fluidtight casing surrounding said second slit, and
gastight means connecting said third casing with said second casing.

3. A monochromator according to claim 2 in which said second casing is provided with an opening turned toward said third casing and said gastight means for connecting said third casing with said second casing comprise on the one hand a rigid tube carried in a fixed manner by said arm and extending between said third casing and a point intermediate between it and said second casing and on the other hand a flexible tube connecting said rigid tube with the inside of said second casing in a gastight manner.

4. A monochromator according to claim 2 in which said second casing is in the form of a surface of revolution about said second pivot axis and is provided with an opening, said gastight means for connecting said third casing with said second casing consisting of a rigid tube extending from said third casing toward said second pivot axis and of a piece rigid with said tube and in the form of a portion of a surface of revolution adapted to fit slidably on the outer wall of said casing in the portion thereof provided with said opening.

References Cited by the Examiner

UNITED STATES PATENTS

| | | | |
|---|---|---|---|
| 2,648,011 | 8/53 | Good | 250—51.5 |
| 2,898,469 | 8/59 | Rose | 250—51.5 |
| 3,042,801 | 7/62 | Holliday | 250—51.5 |
| 3,051,833 | 8/62 | Schumacher | 250—51.5 |
| 3,105,902 | 10/63 | Ostrofsky et al. | 250—51.5 |
| 3,123,710 | 3/64 | Neuhaus | 250—51.5 |

RALPH G. NILSON, *Primary Examiner.*